United States Patent Office 3,423,432
Patented Jan. 21, 1969

3,423,432
PROCESS FOR PREPARATION OF METHYLENE-2 PROPANEDIOL-1-3 AND ITS DERIVATIVES
Francis Weiss, Pierre-Benite, Rhone, and Rena Bensa, Lyon, Rhone, France, assignors to Societe d'Electro-Chimie, d'Electro-Metallurgie et des Acieries Electriques d'Ugine, Paris, France, a corporation of France
No Drawing. Filed Nov. 21, 1963, Ser. No. 325,493
Claims priority, application France, Nov. 27, 1962, 916,757
U.S. Cl. 260—347.8   10 Claims
Int. Cl. C07c *33/02, 35/28*

ABSTRACT OF THE DISCLOSURE

A method for the preparation of methylene-2-propanediol-1-3 and its derivatives by the Diels-Alder reaction of an alpha-beta ethylenic aldehyde and a dienic compound to form a cyclic aldehyde; the cyclic aldehyde is reacted with formaldehyde in an alkaline medium and includes an aldol condensation followed by a Cannizzaro reaction to form a gem-dimethylolated derivative that is subjected to pyrolysis to form methylene-2 propanediol-1-3 and to regenerate the dienic compound.

---

This invention relates to a process for preparation of methylene-2 propanediol-1-3 and its substitution derivatives, with the general formula:

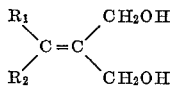

wherein $R_1$ and $R_2$ each represent a member selected from the group consisting of a hydrogen atom, one of a saturated and of an unsaturated aliphatic, alicyclic, aromatic, arylaliphatic, heterocyclic radical.

In spite of their potential interest, these compounds are not well known because they are hard and expensive to produce. Specifically, the methylene-2 propanediol-1-3:

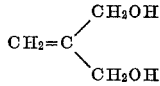

which leads to interesting polyester resins (compare to U.S. Patent 2,435,429 of Aug. 11, 1943, by Shell Development Company, and German Patent 1,012,457 of Jan. 18, 1956, by Chemische Werke Huls), has been prepared in various complex ways with poor yields. Some of the processes heretofore used are mentioned below: A. Mooradian and J. B. Cloke (J. Am. Chem. Soc. 1945, 67, 942) start from pentaerythritol treated by thionyl chloride in pyridine to obtain tri(chloromethyl)ethanol. This latter is oxidized by nitric acid to trichloropivalic acid, which leads to methylene-2 dichloro-1-3 propane, under the action of quinoline. Finally, the dichlorinated derivative is saponified to obtain the diol.

Tribromopivalic acid ($CH_2Br)_3C$—COOH has been treated by anhydrous sodium acetate in acetic acid to obtain diacetate from methylene-2 propane-diol-1-3 whose hydrolysis then leads to diol itself (F. Nerdel, Chem. Ber. 1958, 91, 938).

Monobromohydrin of pentaerythritol, treated by alkaline agent also leads to a poor output of methylene-2 propanediol-1-3 (Ch. Issidores A. I. Matar, J. Chem. Soc. 1955, 77, 6382 and R. Lukes, J. Plesek, Chem. Listy, 1955, 49, 1826).

Moreover, it is noticed that all these processes call into play the degradation of a molecule containing at least 5 carbon atoms, with the loss of 1 carbon atom, to obtain methylene propanediol or its derivatives, thereby rendering the processes expensive.

The derivatives substituted in the lateral chain, few representatives of which are known, are prepared by reducing corresponding malonic esters by aluminum and lithium hydride. The preparation of benzylidene-2 propanediol-1-3 from ethyl benzylidene malonate follows such procedure (R. L. Shivalkar and S. V. Sunthankar, J. Am. Chem. Soc. 1960, 82, 718). Also, in this case, the execution is complex and expensive.

We have perfected a process for preparation of methylene-2 propanediol-1-3 and its substituted derivatives, wherein a reduced number of simple reactional steps and standard cheap industrial reagents are utilized. Specifically, the preparation of methylene-2 propanediol-1-3 itself is effected simply from acrolein and formaldehyde.

Our process for preparing methylene-2 propanediol-1-3 and its substitution derivatives comprises in a first stage starting with an alpha-beta ethylenic aldehyde, with the formula:

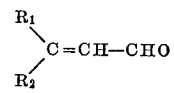

wherein $R_1$ and $R_2$ each represent a member selected from the group consisting of a hydrogen atom, one of a saturated and of an unsaturated aliphatic, alicyclic, aromatic, arylaliphatic, heterocyclic radical. In a Diels-Alder reaction, this aldehyde is contacted in any usual way with a dienic compound. In a second stage, the cyclic aldehyde obtained in the first stage is subjected to the action of formaldehyde in alkaline medium to prepare a corresponding gem-dimethylolated derivative by an aldol condensation reaction followed by a Cannizzaro reaction. Finally, in a third stage, we decompose the derivative obtained in the second stage by heating to a high temperature, 200° C.–600° C., which produces the ethylenic diol, object of the invention, and regenerates the dienic compound used in the first stage.

With the dienic compound identified as D, the succession of the reactions is as follows:

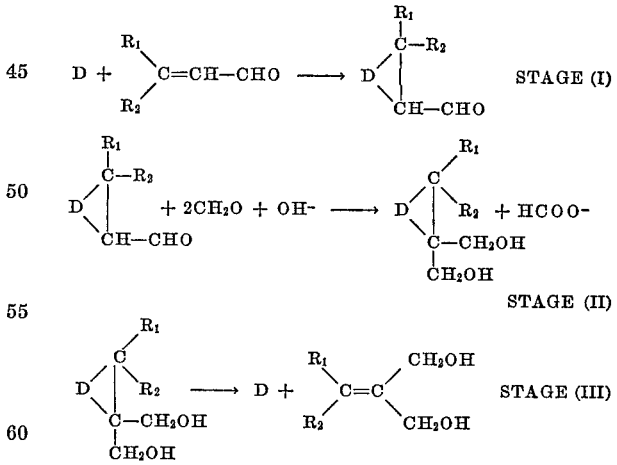

The dienic compound which is not consumed is recycled. Therefore, the total balance of the reaction can be written:

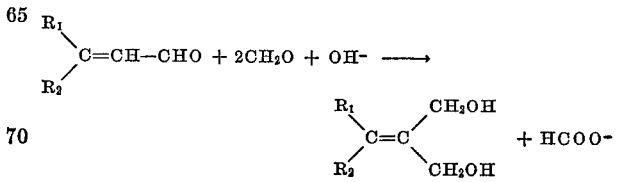

The dienic compounds D which can be used are very numerous. Non-limitative examples are as follows:

(a) The open chain conjugated diolefines, such as butadiene, isoprene, piperylene, dimethyl-2-3 butadiene, etc. In this case, the product resulting from reaction of Stage I is a tetrahydrobenzaldehyde with the formula:

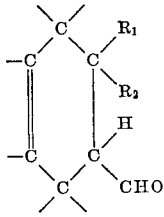

(b) The alicyclic or heterocyclic conjugated diolefines, such as cyclopentadiene and its alkylated derivatives, cyclohexadiene-1-3, furan, etc. In this case, the product resulting from the reaction of Stage I is a bicyclic aldehyde with the formula:

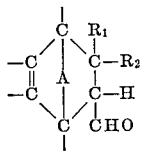

wherein A represents a methylene or ethylene bridge or an oxygen atom, according to the diene.

(c) Anthracene or its derivatives, naphthacene and other polycyclic aromatic compounds known as able to react as dienic partners in the Diels-Alder reaction. In this case, the compounds obtained in the reaction of Stage I are of the type:

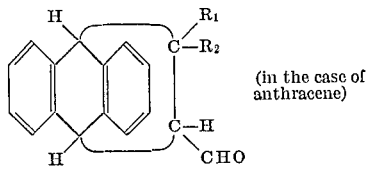

(in the case of anthracene)

Each dienic compound among these three categories, when used in our process, effects a high total yield of product. However, we prefer to use the dienic compounds of the (b) or (c) categories which allow thermal decomposition at lower temperatures than those required for the dienic compounds of category (a). The choice between the (b) and (c) dienic compounds depends above all on the way chosen to operate the thermal decomposition, as described hereinafter.

We can use various alpha-beta ethylenic aldehydes. They are distinguished, as explained by the above formula, for their composition, namely, the necessary presence of a hydrogen atom in the alpha position. Some of these alpha-beta ethylenic aldehydes include: acrolein, crotonaldehyde, pentene-2 al, methyl-3-crotonaldehyde, hexene-2 al, hexadiene-2-4 al (sorbic aldehyde), heptene-2 al, cinnamic aldehyde, beta-furylacrolein, etc.

The dienic synthesis reaction constituting the first stage of the process is executed in a well-known way. The conditions of operation depend on the reactivity of the worked up products, and thereby may vary on a large scale. For instance, one may cause the reaction of cyclopentadiene and acrolein quantitatively in few hours at room temperature; whereas, the working up of another dienic compound, anthracene for example, requires autoclave heating at 100–200° C. for one or two hours in a solvent such as toluene or cyclohexane.

The second stage is executed preferably by adding caustic soda or potassium hydroxide, in a concentrated aqueous solution, to a mixture of the cyclic aldehyde obtained in the first stage, and formaldehyde. The latter may be worked up in the form of an aqueous solution, for example a commercial solution of 30% by weight, or in the form of trioxymethylene or paraformaldehyde.

The stoichiometry of the reaction requires 2 moles of formaldehyde for 1 mole of aldehyde resulting from the first stage, but it is usually preferable to operate with an excess of formaldehyde, that is to say, 2.5 to 10 moles for 1 mole of aldehyde. It is also advantageous to operate in the presence of a solvent, for instance methanol or dioxan.

The temperature for the second stage is maintained between 30 and 100° C., and preferably between 50 and 80° C. When adding the alkaline agent, it is sometimes necessary to cool because the reaction is exothermal.

The addition of the caustic soda or potassium hydroxide may last from 0.5 to 4 hours; often the reaction is finished as soon as the addition comes to an end, but according to the particular nature of the aldehyde employed, it may be necessary to go on heating for 1 to 3 hours between 70 and 100° C. Then, the mixture is allowed to cool, diluted with water eventually, and the diol which precipitates in crystallized state is recovered (this diol had been formed by the second stage reaction). According to the case, an extraction with ether or another solvent immiscible with water permits collection of a small fraction of this diol dissolved in the mother-waters. The reaction mixture also may be concentrated by distilling a part of or the whole solvent before letting this diol crystallize.

The third stage comprises heating the diol resulting from the second stage at a temperature between 200 and 600° C. The choice of the conditions and the operation process depends essentially on the type of the diene used.

Dienic compounds of type (c) lead to diols whose thermal stability is relatively weak and which usually need heating only between 200 and 350° C. so that one operates preferably under air pressure or reduced pressure.

The applied temperatures are usually inferior or equal to the boiling temperature of the diol formed at the second stage, or of the diene compound regenerated during the third stage reaction, so that the operative procedure merely consists in heating the melted product possibly at a reflux temperature.

Often it is advantageous to operate in the presence of a thermally stable diluent such as a hydrocarbon with a high boiling point, for instance diphenyl, terphenyl, dodecylbenzene, a paraffinic oil, or products such as phenyl oxide, etc. The ethylenic diol resulting from cracking distills as soon as it is formed; then it is purified by any known process, for instance, rectification.

Dienic compounds of type (b) lead to more stable diols that need heating at temperatures from 300 to 500° C., to ensure their cracking within a short enough time. At this point also any pressure is suitable, however, it is preferable to operate at atmospheric or reduced pressure. In these cases, the conditions are usually such that the reagent and also the cracking compounds (ethylenic diol and regenerated dienic compound) are reduced to vapor. Therefore, the reaction is executed in the vapor phase by introducing the compound to be cracked into a tube heated at required temperature.

The time the vapors remain in the reactor may vary on a large scale according to the nature of the products and the temperature used. It is preferable to choose conditions such that a satisfactory transformation rate is obtained with a duration of contact between 1 and 50 seconds, and preferably beween 5 and 25 seconds. The vapors escaping from the reactor are condensed and the mixture resulting therefrom is treated, for example, by distillation to separate the constituents.

The operative procedure is identical when dienes of type (a) are used, but it is usually necessary to execute the cracking at high temperatures, about 400 to 600° C.

Moreover, a great number of modifications may be effected in the practice of our process. Particularly during the cracking in vapor phase, one may operate in the presence of gaseous diluents such as nitrogen, carbon dioxide, water vapor. The reaction tube may be empty or filled with an inert material to make thermal exchanges easier. Also, it may be necessary in some cases to add polymerization inhibitors, either during the cracking or during the treatment of the reaction products some of which are easily polymerizable.

The cracking may be executed discontinuously or continuously, the operation in vapor phase being specially suitable for a continuous procedure of execution. When the constitution of the used diene makes the adoption of a cracking in melted phase preferable, for instance in the case of anthracene derivatives or similar ones, we operate continuously as follows: The reactor which may be the boiler of a distilling apparatus, contains some liquid (of inert diluent or product of reaction) maintained at the reaction temperature, and in which the product to be cracked is progressively introduced. The ethylenic diol distills progressively when the regenerated diene gathers in the liquid phase of the reactor.

We draw off at regular intervals or continuously an aliquot part of this liquid phase which is treated to recover the diene, usually by mere cooling and crystallization.

The following, nonlimitative examples illustrate the process of the invention:

EXAMPLE 1

This examyle concerns the preparation of methylene-2-propanediol-1-3 from acrolein and anthracene.

1st stage.—For preparation of the addition product of the anthracene and the acrolein, we introduced into a one-liter autoclave:

—250 g. (1.4 mole) of anthracene,
—81 g. (1.33 mole) of acrolein at 92%,
—250 ml. of toluene,
—0.1 g. of hydroquinone, and heated to 170° C. for two hours while agitating.

Then we cooled to 30° C., filtered the nonreacted anthracene, concentrated the filtrate and let the mixture crystallize. The addition product was washed with a little cold ethanol or carbon tetrachloride.

We obtained 283 g. (0.96 mole) of dihydro-9-10 (formyl-11 ethano) 9–10 anthracene which had a melting point beween 97 and 98° C. The output of this first stage was 91%.

2nd stage.—Preparation of the dihydro-9-10 (dimethylol-11-11 ethano) 9-10 anthracene. We put down in a balloon flask provided with a stirring rod:

—47 g. (0.2 mole) of dihydro-9-10 (formyl-11 ethano) 9–10 anthracene,
—100 ml. of methanol,
—50 g. of formol at 30% (0.5 mole of formaldehyde),
—50 mg. of p-phenylenediamine, and heated at 65° C. while progressively introducing within 1 hour, 11.2 g. (0.2 mole) of KOH in the form of an aqueous potash solution at 35%. Then, we let the mixture cool and filtered and washed the precipitate with some ether. Next the precipitate was purified by recrystallizing in ethanol or carbon tetrachloride.

48 g. (0.16 mole) of dihydro-9-10 (dimethylol-11-11 ethano) 9,10 anthracene with a melting point of about 166–168° C. was obtained and the output of this second stage amounted to 90%.

3rd stage.—Preparation of methylene-2 propanediol-1-3 according to one of the next two embodiments:

(1) We heated 100 g. (0.38 mole) of dihydro-9-10 (dimethylol-11-11 ethano) 9-10 anthracene at 270–280° C. under a 600 mm. Hg pressure in a balloon flask provided with a descending condenser.

The pyrolysis ended in about two hours and 24.5 g. of liquid distillate which carried along some crystallized anthracene was obtained. After the latter was filtrated, we rectified the raw product and obtained:

—7 g. of a light head fraction (boiling point 40° C. under a 10 mm. Hg absolute pressure)
—16 g. of pure methylene-2 propanediol-1-3 with the following properties:

Boiling point under 2–5 mm. Hg ___° C___ 103–105
$d_4^{20}$ ---------------------------------- 1.0745
$n_D^{20}$ ---------------------------------- 1.4738

The corresponding data found in the literature are:

Boiling point under 2 mm. Hg ____° C__ 93–95
$d_4^{20}$ ---------------------------------- 1.0791–1.0813
$n_D^{20}$ ---------------------------------- 1.4731–1.4758

The pyrolysis output amounted to 48%.

The titrations of the alcohol function by acetic anhydride and of double bonds by bromination showed a purity of 98.5–99%. The anthracene was recovered quantitatively.

(2) We heated in the same apparatus as before, 100 g. of liquid paraffin at a temperature of 280° C. under 600 mm. Hg and then introduced progressively, in 45 minutes, 100 g. (0.38 mole) of dihydro-9-10 (dimethylol-11-11-ethano) 9-10 anthracene and continued heating for 30 minutes at the same temperature.

28 g. of liquid distillate was obtained and was rectified to obtain 21.8 g. of pure methylene-2 propanediol-1-3, after having separated a small fraction of light products. The pyrolysis output amounted to 65% of theoretical output.

EXAMPLE 2

This example also concerns the preparation of methylene-2 propanediol-1-3, but from acrolein and cyclopentadiene.

In a first stage, formyl-2 bicyclo(2,2,1)heptene-5 was produced by causing cyclopentadiene to act upon acrolein (for example: see Roger Adams Organic Reaction IV, page 90, Wiley & Sons, 1948).

In a second stage, this product reacted with formaldehyde in the apparatus used in the second stage of Example 1 and under similar conditions.

We put in the balloon flask:

—244 g. (2 moles) of formyl-2 bicyclo(2,2,1)heptene-5,
—1 g. of methanol,
—500 g. of formol at 30% (5 moles of formaldehyde).

We heated at 80° C. and progressively introduced within 1 hour, 112 g. of potash (2 moles), in the form of an aqueous solution at 35%. Next, we concentrated the mixture by distilling the greater part of the methanol and then the mixture was allowed to cool. The diol which precipitated was filtered and then washed in cold water. The diol was purified by recrystallization or distillation.

Thus, we obtained 253 g. (1.64 moles) of dimethylol-2-2 bicyclo(2,2,1)heptene-5, with the formula:

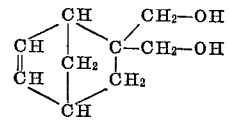

Its melting point was 108° C. and the output was 82%.

Finally, in a third stage, the methylene-2 propanediol-1-3 was prepared by cracking the diol from the second stage. 60 g. per hour (0.39 mole) of previously melted dimethylol-2-2 bicyclo(2,2,1)heptene-5 was poured in a stainless steel tube 450 mm. in length and 17 mm. in diameter. The U-shaped tube was plunged in a melted salt bath maintained at 400° C., for about 17 seconds. For 100 g. (0.65 mole) of constituents used, 80.4 g. of raw product of reaction were made, the distillation of which produced, besides regenerated cyclopentadiene and some light products, 31 g. of methylene-2 propanediol-1-3. The pyrolysis output amounted to 54%.

EXAMPLE 3

This example relates to preparation of a substituted derivative of methylene-2 propanediol-1-3, the following methylol-2 butene-2 ol-1

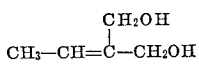

In a first stage, methyl-2 formyl-3 bicyclo(2,2,1)heptene-5 was prepared by causing the reaction of cyclopentadiene with crotonaldehyde (see, for example, Diels Alder and Coll; Ann. Chem. 1929, 470, 62–63).

Then, in a second stage, we effected the reaction of this compound with formaldehyde under the conditions described in the previous example, to obtain methyl-2 dimethylol-3-3 bicycloheptene-5. This product melts at 97–98° C. and was obtained with an output of 57%.

The pyrolysis of this diol was effected in a third stage as in the previous example, and we obtained from 43 g. (0.256 mole) of this diol, 38.5 g. of cracked raw product, whose rectification produced 13 g. of methylol-2 butene-2 ol-1 (0.128 mole). Its melting point was 110–113° C. under 2–3 mm. Hg. The pyrolysis output reached 50%.

While we have described preferred embodiments of our invention, it may be otherwise embodied within the scope of the appended claims.

We claim:
1. A method for the preparation of methylene-2 propanediol-1-3 and its derivatives comprising:
   (a) reacting a compound selected from the group consisting of acrolein, crotonaldehyde, pentene-2 al, methyl-3 crotonaldehyde, hexene-2 al, hexadiene-2-4 al, heptene-2 al, cinnamic aldehyde, and beta-furylacrolein with a hydrocarbon conjugated diene in a Diels-Alder reaction to form a cyclic aldehyde;
   (b) reacting the cyclic aldehyde with between 2 to 10 moles of formaldehyde per mole of cyclic aldehyde in an alkaline medium at a temperature between 30° C. and 100° C., said reaction including an aldol condensation followed by a Cannizzaro reaction to form a gem-dimethylolated derivative; and
   (c) subjecting the gem-dimethylolated derivative to pyrolysis at a temperature between 200° C. and 600° C. to form methylene-2 propanediol-1-3 and its derivatives and to regenerate the hydrocarbon conjugated diene used in step (a).

2. A method for the preparation of methylene-2 propanediol-1-3 and its derivatives comprising:
   (a) reacting a compound selected from the group consisting of acrolein, crotonaldehyde, pentene-2 al, methyl-3 crotonaldehyde, hexene-2 al, hexadiene-2-4 al, heptene-2 al, cinnamic aldehyde, and beta-furylacrolein with a hydrocarbon conjugated diene in a Diels-Alder reaction to form a cyclic aldehyde;
   (b) reacting the cyclic aldehyde with between 2 and 10 moles of formaldehyde per mole of cyclic aldehyde in a concentrated aqueous solution selected from the group consisting of sodium hydroxide and potassium hydroxide at a temperature between 50° C. and 80° C. to form a mixture including a diol;
   (c) permitting said mixture to cool and diluting it with water, said diol being precipitated out of said mixture in a crystallized state; and
   (d) heating said diol to a temperature between 200° C. and 600 C. to form methylene-2 propanediol-1-3 and to regenerate the hydrocarbon conjugated diene.

3. The process of claim 1 characterized by carrying out step (c) under a pressure between 0.001 and 1.0 atmosphere.

4. The method of claim 1 characterized by the hydrocarbon conjugated diene being selected from the group consisting of butadiene, isoprene, piperylene, and dimethyl-2-3 butadiene.

5. The method of claim 1 characterized by the hydrocarbon conjugated diene being selected from the group consisting of cyclo pentadiene and its alkylated derivatives, cyclo-hexadiene-1-3, furan, anthracene and its derivatives and naphthacene.

6. The method of claim 2 characterized by said dienic compound being selected from the group consisting of anthracene and its derivatives and naphthacene.

7. The method of claim 6 wherein step (d) includes heating said diol in the presence of a thermally stable diluent selected from the group consisting of diphenyl, terphenyl, dodecylbenzene, a paraffinic oil and phenyl oxide, whereby said ethylenic diol formed from said heating is distilled upon heating.

8. The method of claim 2 characterized by said dienic compound being selected from the group consisting of cyclo hexadiene-1-3, furan, cyclo-pentadiene and its alkylated derivatives.

9. The method of claim 8 wherein step (d) includes introducing said diol to a reaction tube heated to a temperature between 300° C. and 500° C. to cause said diol and regenerated dienic compound to vaporize, said transformation being effected with a contact duration of between 1 and 50 seconds, permitting said vapors to escape from said tube; condensing the vaporized mixture; and distilling said mixture to obtain methylene-2 propanediol-1-3 and said dienic compound of step (a).

10. The method of claim 9 characterized by said dienic compound being selected from the group consisting of butadiene, isoprene, piperylene, and dimethyl-2-3 butadiene, and wherein said reaction tube is heated to a temperature between 400° C. and 600° C.

References Cited

UNITED STATES PATENTS 3,071,599   1/1963   Hales et al. _____ 260—347.8

NICHOLAS S. RIZZO, *Primary Examiner.*

B. I. DENTZ, *Assistant Examiner.*

U.S. Cl. X.R.

260—618, 635